Figure 3:
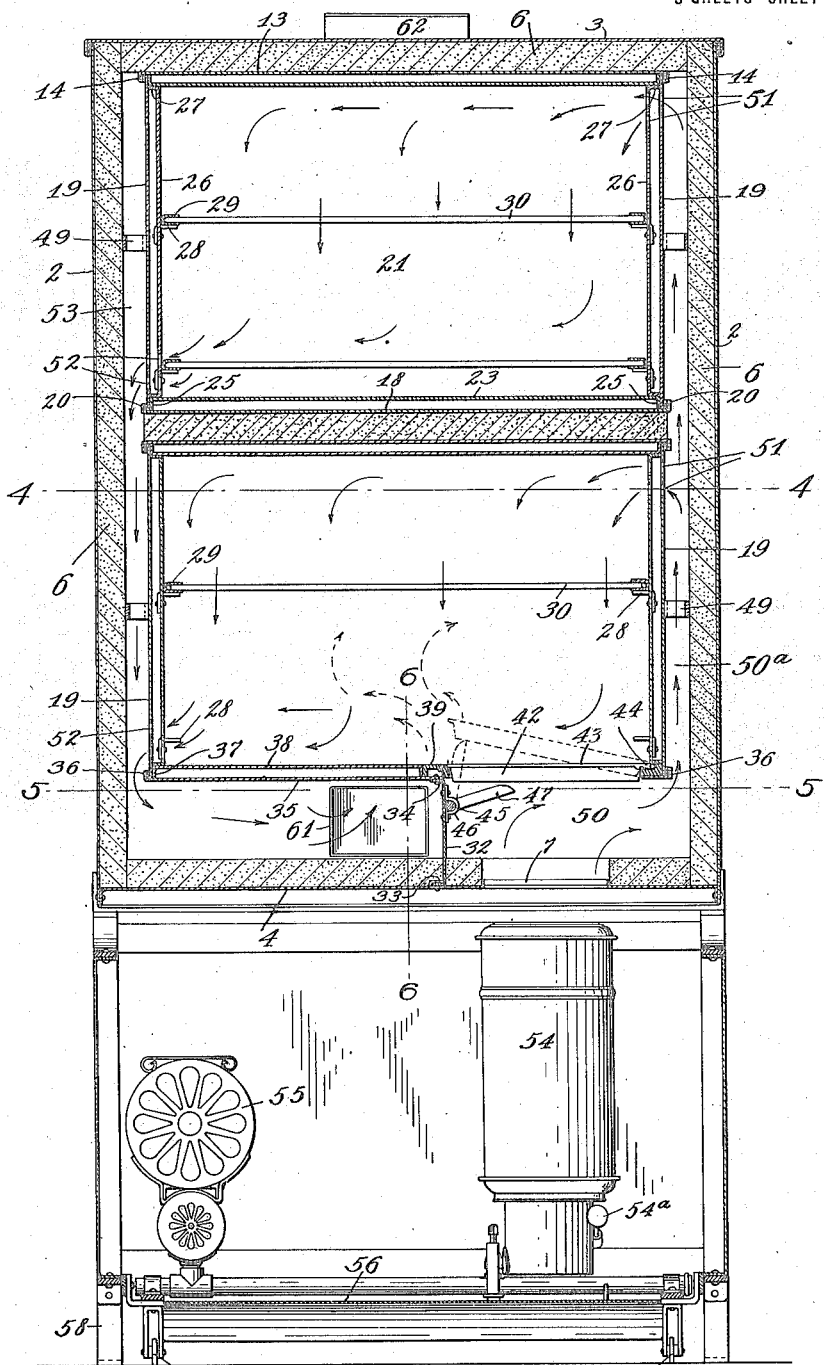

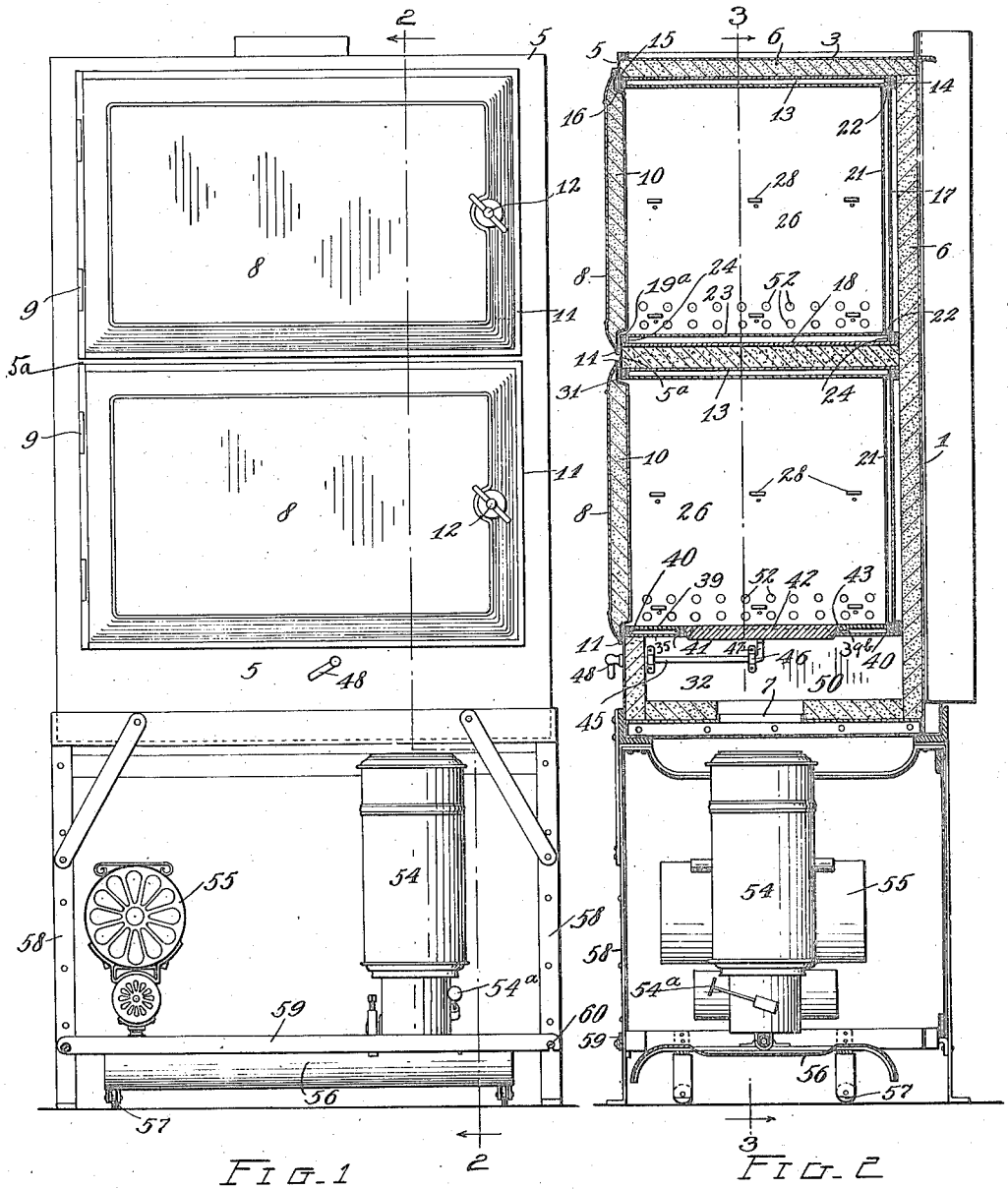

W. R. JEAVONS.
APPARATUS FOR COOKING.
APPLICATION FILED FEB. 15, 1912.

1,271,168.

Patented July 2, 1918.
3 SHEETS—SHEET 2.

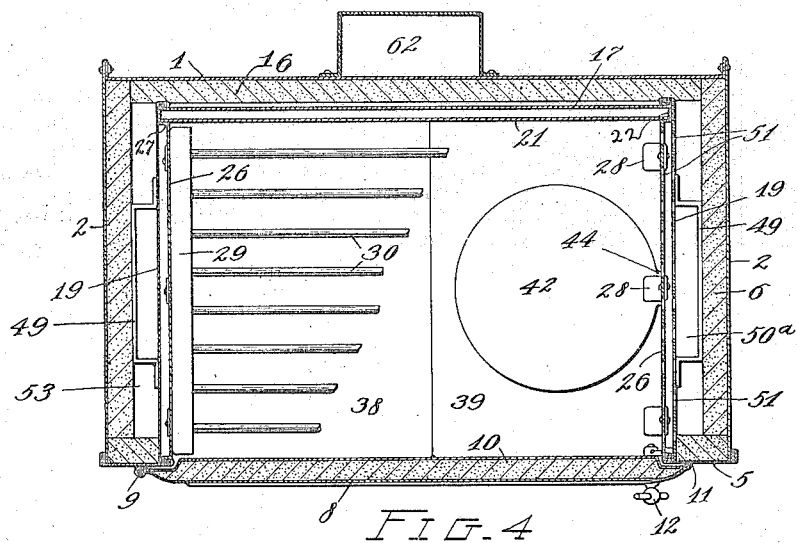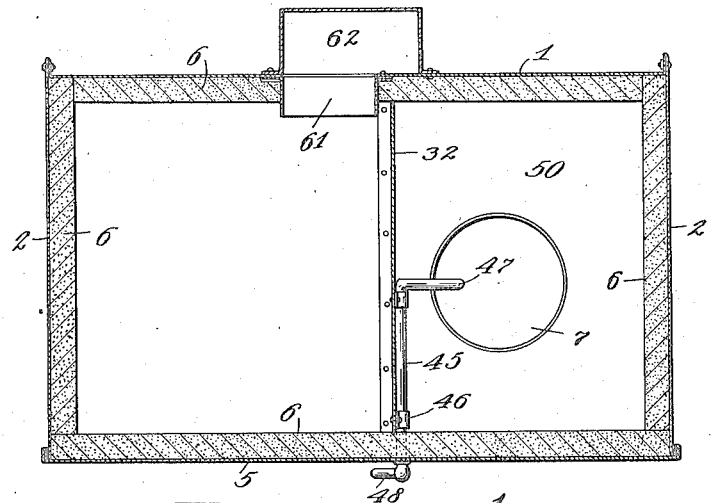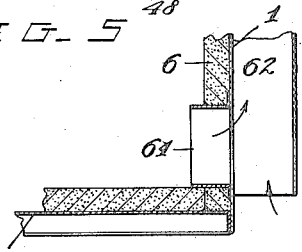

UNITED STATES PATENT OFFICE.

WILLIAM R. JEAVONS, OF CLEVELAND, OHIO.

APPARATUS FOR COOKING.

1,271,168.      Specification of Letters Patent.    Patented July 2, 1918.

Application filed February 15, 1912. Serial No. 677,799.

*To all whom it may concern:*

Be it known that I, WILLIAM R. JEAVONS, a citizen of the United States, residing at Cleveland, in the county of Cuyahoga and State of Ohio, have invented a certain new and useful Improvement in Apparatus for Cooking, of which the following is a full, clear, and exact description, reference being had to the accompanying drawings.

This invention relates to a new and improved apparatus for cooking, wherein the articles to be cooked are submerged in the heated gases or products of combustion from a burner, or other source of heat, the said gases being introduced into the top of the compartment in which the cooking is to be accomplished and being distributed laterally and evenly, by reason of their specific gravity, throughout the compartment, gradually filling it from above and submerging the food stuffs therein before flowing out of the vents near the bottom of the compartment. By this mode of applying the heated gases, the temperature of the gases in the top of the compartment is somewhat greater than that of the gases at the bottom of the compartment, whereby the food stuffs are subjected to a somewhat higher temperature at the top than at the bottom thereof. An important feature of this apparatus is that it enables the heated gases and products of combustion to be gaged or controlled so as to maintain a temperature that will keep the food stuffs at a cooking point below the boiling point and extending over a long period of time. It has been found that, in cooking oat meal, for instance, a maintained temperature ranging between one-hundred fifty and one-hundred ninety degrees Fahrenheit may be employed, the use of any specific temperature within the above ranges in connection with my method meaning merely a longer or shorter time interval of cooking, but resulting in each case in leaving the flakes whole or distinct and perfectly cooked; whereas, by using the ordinary methods of cooking and utilizing the same temperatures over the same intervals of time and applying the products of combustion or heated gases to the bottom of the utensil, the oatmeal will sour within the range of the lower temperature and will have its flakes or kernels disintegrated within the range of the higher temperature. Furthermore, in cooking with my apparatus, there will be no mixing of the odors of foods cooked at the same time in different compartments, which receive their heated gases from a common source and discharge the gases into a common flue. The invention also relates to an apparatus of the oven type whereby the results referred to may be realized and wherein the heating gases are utilized in a particularly efficient manner; also to an improved construction of oven for securing these results.

In constructing an apparatus for obtaining the results above set forth, provision is made so that in case of emergency the flame may be raised to a high point and the products of combustion may be directed immediately into the bottom of the lowest of a series of compartments, thereby making it possible to heat this particular compartment to a higher degree than would be possible with the products entering the top of such compartment, as before described. With this arrangement, the products may be used for slow cooking with a low flame and comparatively low temperatures extending over a relatively long period of time; also the products or heated gases may enter the lower compartment directly and heat it to the high temperatures employed in ordinary cooking, wherein the food stuffs are cooked in a relatively short period of time.

In the drawings forming part hereof, Figure 1 represents a front elevation of a cooking apparatus constructed in accordance with my invention; Fig. 2 a sectional view corresponding to the line 2—2 of Fig. 1; Fig. 3 an enlarged sectional view corresponding to the line 3—3 of Fig. 2, the device for applying heat being shown in elevation; Fig. 4 a sectional detail corresponding to the line 4—4 of Fig. 3, certain parts being broken away; and Figs. 5 and 6 sectional details corresponding respectively to the lines 5—5 and 6—6 of Fig. 3.

Describing the parts by reference characters, 1 denotes generally the back, 2 the sides, 3 the top, 4 the bottom and 5 the front of an oven casing. The outer walls are preferably of sheet metal having applied thereto a lining 6 of asbestos or other similar non-heat-conducting material. The bottom is provided at one side thereof with an opening 7 for the application of the heating gases thereto and the front 5 is provided with a suitable number of openings adapted to be closed by doors 8, said doors being hinged at one side of the front, as shown at 9. Each door comprises inner and outer sheet metal plates having non-heat-conducting material 10 therebetween, the said plates being brought close together near their outer edges with the edges in contact, as shown at 11, to provide an inwardly directed resilient flange bounding the top, bottom, and free or swinging edges of the door, said resilient flanges providing means whereby a tight joint may be formed with the outer metal surface of the oven front when the doors are drawn to their seats by the operation of the handles 12. In the casing described there are seated a plurality of ovens arranged in vertical series (two such ovens being shown), the ovens being conveniently constructed and supported in the following manner:

13 denotes a top plate of one of the ovens, the said plate being provided with substantially U-shaped rear and side flanges 14, the front of the plate 13 being provided with a down-turned flange 15 adapted to fit within and be supported by a U-shaped flange 16 formed on the front plate 5 above the upper door opening. 17 denotes a rear plate for the upper oven having U-shaped flanges at the top, bottom and sides thereof adapted to fit within the corresponding flanges of the top plate 13, bottom plate 18 and side plates 19. The front end of the bottom plate 18 is provided with an up-turned flange fitting within an inverted U-shaped flange 19ª on the transverse sheet metal plate 5ª forming part of the oven casing front. 19 denotes the oven side plates, each having a U-shaped flange at the top and bottom thereof interlocking respectively with the flanges 14 on the top plate and the lateral U-shaped flanges 20 on the bottom plate 18. The oven thus formed is provided with a knock-down lining conveniently constructed and applied thereto as follows:

21 denotes the rear lining plate, said plate having rearwardly directed flanges 22 at the top, bottom and sides thereof adapted to abut against the outer rear plate 17 and space the body of the plate 21 therefrom. The body of the plate 21 extends the full length of the plate 17 but not the full height thereof, spaces being provided between the top and bottom of the former plate and the corresponding parts of the latter plate, the bottom flange of the plate 21 resting upon the bottom lining plate 23, which is provided with down-turned flanges 24 and 25 whereby it is supported upon and spaced from the plate 18. The plate 23 is the same length as the bottom plate 18, the lateral down-turned flanges 25 of the former plate substantially abutting against the side plates 19, as will appear from Fig. 3. 26 denotes the lining plates for the sides of the oven, each of said plates being provided with laterally projecting flanges 27 at the top, bottom, and sides thereof adapted to project against the corresponding side plate 19 and form a space between the bodies of the plates 19 and 26. The plates 26 are provided each with the inwardly projecting seats 28 for the shelves, seats for two such shelves being shown in each oven. Each shelf is shown as consisting of a pair of folded sheet metal lateral edges 29 between which extend the rods 30, said rods connecting the sheet metal edges and forming a grid therewith. These shelves rest upon the seats 28 and serve as a means for retaining the plates 26 in place.

With the exception of the construction of the oven bottom, the lower oven is constructed in identically the same manner as the upper, and the same numerals are applied to the top, back and sides of the two ovens, it being noted that the upper plate 13 of the lower oven is supported at its front by the U-shaped flange 31 depending from the bottom of the plate 5ª. As to the bottom of the lower oven, it is substantially identical in construction as to one side thereof with the construction of the bottom of the upper oven. As the lower oven is adapted, under certain circumstances, to receive the products of combustion and heated gases directly through the bottom thereof and has its bottom normally exposed to such gases, the bottom construction is modified as follows:

32 denotes a vertical plate extending beneath the lower oven from front to rear thereof and having lateral flanges 33 and 34 at the bottom and top thereof, respectively, by means of which it is connected respectively to the bottom 4 of the oven casing and to the sheet metal bottom section 35 of the lower oven. The lateral edge of the plate 35 is folded as shown at 36 to form a seat for the lower end of the plate 19 and the plate 35 supports the down-turned end 37 of a bottom liner plate 38, the opposite down-turned end of which abuts against the down-turned flange of the casting 39, which, together with the coöperating portion of the sheet metal bottom plate 35, forms the remainder of the bottom of the lower oven. The casting 39 rests upon the plate 35. The front and back ends of the casting 39 are flanged downwardly as shown at 40, whereby this casting is supported in the same manner as the liner plate 23, and the bottom plate 35 is provided with upwardly extending front and rear flanges similar to those on the bottom plate 18. The purpose of employing a casting in the construction of the plate 39 is to enable the rigid and durable seat 41 to be formed therein for a lid 42. The lid is so designed as to present a large area to contact with the products of combustion, thereby providing a very hot plate upon which frying or other active cooking can be done. It is preferably made out of cast iron to resist heat and has an outwardly projecting flange 43 by which it is supported in the annular seat 39$^b$. This flange is extended, as shown at 44, such extension resting in a seat provided in the casting 39. For the purpose of rocking the lid on the pivotal extension 44, a rock shaft 45 is provided, which shaft is conveniently supported in straps 46 on the plate 32, said shaft having an arm 47 located beneath and adapted to engage the lid 42 opposite its pivotal extension 44. For the purpose of rocking this shaft, the operating handle 48 is provided outside the oven casing. The bottom 4 of the oven casing is provided with the opening 7 referred to hereinbefore, said opening being in vertical alinement with the lid 42.

As will appear from Figs. 2, 3 and 4, the ovens extend across the oven casing from front to rear thereof, but are spaced from the side walls of the casing, as by means of U-shaped straps 49. By means of the plate 32, a lateral and upwardly directed flue for the products of combustion is formed at one side of the bottom of the oven casing and at one side of the ovens therein, as shown at 50 and 50$^a$, the products of combustion and heated gases introduced through the opening 7 passing through the bottom flue 50 and ascending the lateral flue 50$^a$. The upper end of the flue 50$^a$ is defined by the upper end of the casing and the upper oven, and said oven is provided, in the side wall thereof which forms one side of said flue, with openings 51, formed in the outer side plate 19 and the lining plate 26, for the admission of the heated gases into the upper portion of the oven. At a point just above the bottom of this oven, outlet openings 52 in the opposite side plate and lining plate are provided, whereby such gases are discharged into the descending flue 53 on the opposite side of the oven casing from the flue 50$^a$. The lower oven is provided with the similar openings 51 and 52, in addition to the opening provided in one side of the bottom, and controlled by the lid 42.

For the purpose of applying heating means to the stove construction above-described, a burner having a chimney 54 is provided, which chimney is adapted to register with the opening 7. This burner may be an oil stove burner of the type shown in my Patent No. 848,828, issued April 2nd, 1907, and is provided with a wick raiser 54$^a$ for varying the temperature of the heated gases supplied to the cooking apparatus. The burner is supplied from a reservoir 55, and the burner and reservoir are mounted on a platform 56 having rollers 57 thereunder, whereby the stove construction thus formed may be inserted beneath the oven structure and removed therefrom when desired. For the accommodation of the stove, the oven structure will be supported upon a frame work 58 comprising a plurality of vertically arranged members and the stove may be conveniently retained in place in such frame work by means of a bar 59 pivoted at one end to one of the vertical members and provided at its opposite end with a hook adapted to be engaged by the head 60 of a pin or screw.

From the foregoing description, it is believed that the operation will be clear. With the parts in the positions shown in full lines in Fig. 3, the heated air and products of combustion discharged from the burner chimney 54 will pass through the opening 7 laterally through the flue 50 and ascend the flue 50$^a$, whence they will be discharged through the openings 51 into the upper portions of the ovens, will distribute evenly throughout the ovens, and will fill said ovens and escape through the apertures 52 into the down-flue 53, thence into the bottom flue 53$^a$ beneath the lower oven, whence they are discharged through a collar 61, beneath the central portion of the lower oven, into a vertically extending flue 62 at the rear of the oven casing. The vertically extending flue is open at the bottom, whereby no appreciable draft will be produced upon the heated gases to facilitate their progress through the ovens. By manipulating the handle 48, the lid 42 may be opened, as shown in dotted lines in Fig. 3, thus affording a direct inlet through the bottom of the lower oven, allowing the entire amount of the heated gases and products of combustion to pass through the lower compartment, out through the openings 51 at the upper part of the compartment into the flue 50$^a$ and thence through the other compartments, as already described. The lid 42 not only provides a construction whereby the heated gases may be supplied directly through the lower oven, but also provides a surface against which the heated gases from the chimney 54 may impinge, which surface is adapted to withstand the action of these gases without injury and also to provide a hot plate upon which active cooking may be done.

By the construction illustrated and described herein, the articles to be cooked are normally submerged in the heated gases and products of combustion supplied from the burner 54. The hottest gases and products of combustion accumulate in the top of each compartment and the cooler gases and products of combustion escape through the openings 52 at the bottom of each compartment. The articles to be cooked are submerged in the heated gases and products of combustion and are exposed to a somewhat higher temperature at the top than at the bottom. This method of cooking has been found to be of great advantage when applied to certain articles of food, such as cereals, enabling these articles to be cooked at a temperature which, when the gases are applied in the ordinary manner, would result in souring or fermenting the cereals, and also allowing the articles to be heated to a temperature which, when the gases are applied in the ordinary manner will result in the disintegration of the grains of the cereals. In addition to realizing the method referred to hereinbefore, the apparatus itself is extremely efficient and possesses all of the advantages of the devices known to the trade as "fireless cookers." The temperature in the lower compartment or oven is considerably higher than that in the upper oven or compartment, owing not only to its nearer proximity to the burner, but to the radiant heat which it receives from the lid 42. When this lid is tilted upwardly and the lower oven receives the direct draft from the burner and the burner is operated at high flame, the temperature of the lower oven will be much higher than when operated with the burner at low flame and the lid closed. In the latter case, the temperature of the upper oven will be about half that of the lower. Furthermore, when operating at low flame and with the lid 42 closed, no special concern need be given the length of time that the articles are cooked, a difference of several hours in the length of time that such articles as meat, beans and bread are cooked making no material difference in the quality and edibility of these articles.

Having thus described my invention, what I claim is:

1. The combination of a vertical series of compartments, each having one or more inlet openings adjacent to the upper end thereof and one or more outlet openings near the bottom thereof on the side opposite the inlet opening or openings, there being a common flue for supplying heated gases to said inlet openings, and means for supplying heated gases at regulated temperatures beneath the lowest compartment, said compartment having a damper controlled inlet in the bottom for admitting the heated gases directly thereinto.

2. In a cooking apparatus, the combination of a casing, a vertical series of compartments therein there being a flue extending beneath the lowest compartment and upwardly between a side of each compartment and the casing wall and there being a downwardly directed flue on the opposite side of the compartments from the first mentioned flue, said compartments being provided each with one or more openings near its upper end communicating with the first-mentioned flue and with one or more openings near its bottom communicating with the second flue, a source of heated gas supply beneath the lowest compartment, and means for varying the temperature of the gases supplied therefrom, there being a damper controlled inlet opening in the bottom of the lowest compartment.

3. In a cooking apparatus, the combination of a casing, a vertical series of compartments therein, there being a flue extending beneath the lowest compartment and upwardly between a side of each compartment and the casing wall and there being a downwardly directed flue on the opposite side of the compartments from the first-mentioned flue, said compartments being provided each with one or more openings near its upper end communicating with the first-mentioned flue and with one or more openings near the bottom thereof communicating with the second flue, and a source of heated gas supply beneath the lowest compartment, there being a damper controlled inlet opening in the bottom of the said lowest compartment.

4. In a cooking apparatus, the combination of a casing, an oven in said casing, there being an upwardly extending flue formed between a side of the oven and the casing, means for discharging heated gases into said flue, said oven having one or more apertures in the upper portion of said side communicating with said flue and also having one or more apertures in the lower portion of the opposite side, there being a downwardly extending flue in said casing with which the last-mentioned apertures communicate and a bottom flue beneath the oven having a discharge outlet and communicating with the last-mentioned flue.

5. In a cooking apparatus, the combination of a casing, an oven in said casing, there being a laterally extending flue beneath said oven and an upwardly extending flue formed between a side of the oven and the casing, means for discharging heated gases into the first-mentioned flue, said oven having one or more apertures in the upper portion of said side communicating with the second flue and also having one or more apertures in the lower portion of the opposite side, there being a downwardly extending flue in said casing with which the last-mentioned apertures communicate and a second laterally extending flue beneath said oven having a discharge outlet and communicating with the last-mentioned flue.

6. In a cooking apparatus, the combination of a casing, an oven in said casing, said oven being spaced from opposed walls of the casing to form flues therewith, means for discharging heated gases into one of said flues, the oven having one or more apertures in its upper end communicating with the last-mentioned flue and having one or more apertures near its bottom communicating with the other flue, and connections for discharging the gases from the lower end of the latter flue beneath the oven and outside the casing.

7. In a cooking apparatus, the combination, of a casing, an oven in said casing and spaced from opposite walls thereof and from the bottom of the casing, a partition extending across and dividing the space between the bottom of the oven and the casing, means for discharging heated gases into the bottom of the casing at one side of said partition, said oven having one or more apertures near the top thereof communicating with the space into which the heated gases are discharged and having one or more apertures near the bottom thereof communicating with the space on the opposite side of the oven, there being a discharge outlet on the opposite side of the partition from the point of supply of gases thereto.

8. In a cooking apparatus, the combination of a casing, an oven in said casing and spaced from the bottom and from opposite side walls thereof to form flues, there being a partition extending across the space between the bottom of the oven and the casing, means for discharging heated gases at one side of the said partition and into the flue formed at one side of the oven, there being an outlet for such gases beneath the bottom of the oven on the opposite side of the partition, said oven having one or more apertures near the top thereof communicating with the last-mentioned flue and having one or more apertures near the bottom thereof communicating with the other flue.

9. In a cooking apparatus, the combination of an oven, a casing forming a flue with each side of the oven and having an inlet and an outlet in a flue beneath the oven, means for circulating heated gases through the inlet, beneath said oven and upwardly in one of said flues, through the oven from the upper to the lower portion thereof, downwardly through the opposite flue, and beneath the oven to the discharge outlet.

10. In a cooking apparatus, the combination of a casing of relatively non-heat-conducting material, a vertical series of ovens in said casing, there being vertically extending flues formed on opposite sides of said ovens and between the same and the casing, each of said ovens having one or more apertures in the upper portion thereof communicating with one of said flues and one or more apertures in the lower portion thereof communicating with the other of said flues, and means for supplying heated gases to the first-mentioned flue.

11. In a cooking apparatus, the combination of a casing having an inlet aperture in the bottom thereof, an oven in said casing spaced from one side and the bottom wall thereof and located above said aperture, a transverse partition extending across the space between the oven and the bottom of the casing at one side of said aperture, the oven having one or more apertures near the top thereof communicating with the space on the inlet side of the partition and having one or more apertures near the bottom thereof communicating with the space on the opposite side of said partition, and a lid above the aperture in the bottom of the casing.

12. In a cooking apparatus, the combination of a casing having an inlet aperture in the bottom thereof, an oven in said casing spaced from the side and bottom walls thereof and located above said aperture, and a transverse partition extending across the space between the oven and the bottom of the casing at one side of said aperture, there being a discharge outlet for said space on the opposite side of said partition, the oven having one or more apertures near the top thereof communicating with the space on the inlet side of the partition and having one or more apertures near the bottom thereof communicating with the space on the opposite side of the partition, and the oven having a lid movably supported above the aperture in the bottom of the casing.

13. In a cooking apparatus, the combination of an oven having an aperture in the bottom thereof, a lid for said aperture, a casing surrounding said oven and having flues located at opposite sides thereof and being spaced from the bottom of the oven, the flues communicating with the last-mentioned space, a partition extending across the space between the casing and the oven bottom, means for discharging heated gases into said space beneath said lid, the oven being provided with apertures communicating with said flues, there being an outlet from the space beneath the oven on the opposite side of the partition from the inlet for heated gases, and means for operating said lid to permit the heated gases to enter the oven directly.

14. In a cooking apparatus, the combination of a casing having an aperture in the bottom thereof, an oven in said casing spaced from the bottom and from opposite sides of the casing to form flues, a partition interposed between the oven and the casing bottom at one side of the aperture, the space beneath the oven at the opposite side of the partition being provided with a discharge outlet near the rear-central portion of said space, a vertically extending open ended flue with which said outlet communicates, means for discharging heated gases through said aperture, means for circulating such gases from the aperture, up one of the lateral flues, across and through said oven from the top of one side to the bottom of the other and down the other lateral flue and beneath the bottom of the oven to the outlet.

15. In a cooking apparatus, the combination of a casing, a vertical series of ovens in said casing spaced from the side and bottom walls of the casing and forming therewith a bottom inlet flue, a side supply flue, a side outlet flue and a bottom discharge flue, means for supplying heated gases to the two first-mentioned flues and through and across said ovens into the side outlet flue, the bottom discharge flue being provided with a centrally arranged outlet connection at the rear thereof, and a vertically extending open ended flue connecting with said outlet.

16. In an oven, the combination, with outer top, bottom rear and side walls, of a liner plate for the bottom and removably supported thereby, side and rear liner plates resting on the bottom liner plate and having outturned flanges whereby they were spaced from their respective outer walls, and a top liner plate having lateral flanges arranged to space it from the top outer plate or wall and resting on top of the lateral flanges of the rear and side walls.

17. In an oven, the combination, with outer top, bottom, rear and side walls, of a liner plate for the bottom and removably supported thereby, side and rear liner plates having out-turned flanges whereby they are spaced from their respective outer walls and a top liner plate having lateral flanges arranged to space it from the top outer plate or wall and resting on top of the lateral flanges of the rear and side walls.

18. In an oven, the combination, with outer top, bottom, and side walls of a bottom liner plate removably seated on the bottom wall, side liner plates having out-turned flanges and adapted to rest on the bottom liner plate and having inwardly projecting shelf seats, one or more shelves on said seats, and a top liner plate removably seated on the flanges of the side plates.

In testimony whereof, I hereunto affix my signature in the presence of two witnesses.

WILLIAM R. JEAVONS.

Witnesses:
J. B. HULL,
BRENNAN B. WEST.